United States Patent [19]

Paliwoda et al.

[11] Patent Number: 5,482,432
[45] Date of Patent: Jan. 9, 1996

[54] BEARINGLESS AUTOMOTIVE COOLANT PUMP WITH IN-LINE DRIVE

[75] Inventors: Joseph Paliwoda, West Bloomfield; Verle Propst, Rochester Hills, both of Mich.

[73] Assignee: Deco-Grand, Inc., Royal Oak, Mich.

[21] Appl. No.: 182,974

[22] Filed: Jan. 18, 1994

Related U.S. Application Data

[63] Continuation-in-part of Ser. No. 791,725, Nov. 14, 1991, Pat. No. 5,279,503, which is a continuation-in-part of Ser. No. 549,742, Jul. 9, 1990, abandoned.

[51] Int. Cl.⁶ ............................. F04D 29/10; F04B 35/00
[52] U.S. Cl. .................. 415/168.2; 415/111; 415/122.1; 415/124.2; 415/214.1; 415/229; 415/230; 415/231; 416/169 A; 417/319; 417/423.6; 417/423.11; 417/423.12; 464/901; 123/41.46; 123/41.49; 403/294; 403/296; 403/343; 403/380
[58] Field of Search .................... 415/111, 112, 415/113, 122.1, 124.1, 124.2, 168.2, 174.2, 229–231, 214.1; 416/169 A; 123/41.44, 41.46, 41.49; 403/294, 296, 343, 376, 380; 464/182, 901; 417/319, 350, 423.11, 423.6, 423.12, 423.13; 411/5, 402, 403, 404, 410

[56] References Cited

U.S. PATENT DOCUMENTS

| | | | |
|---|---|---|---|
| 1,866,551 | 7/1932 | Durdin, Jr. ............................. | 415/231 |
| 2,019,476 | 11/1935 | Brownlee . | |
| 2,149,194 | 2/1939 | Stopp ....................................... | 464/182 |
| 2,264,945 | 12/1941 | Le Fevre . | |
| 2,277,333 | 3/1942 | Leopold ................................. | 403/343 |
| 2,397,216 | 3/1946 | Stellin .................................... | 411/404 |
| 2,646,001 | 7/1953 | Ray . | |
| 2,694,981 | 11/1954 | Daugherty et al. ................... | 415/168.2 |
| 2,745,351 | 5/1956 | Zozulin . | |
| 2,820,655 | 1/1958 | Hileman . | |

(List continued on next page.)

FOREIGN PATENT DOCUMENTS

| | | | |
|---|---|---|---|
| 0664648 | 11/1963 | Canada ................................... | 415/231 |
| 1235877 | 5/1988 | Canada . | |
| 0032880 | 7/1981 | European Pat. Off. . | |
| 0323210 | 7/1989 | European Pat. Off. . | |
| 2281042 | 3/1976 | France . | |
| 2377751 | 8/1978 | France . | |
| 2519694 | 7/1983 | France . | |
| 2608228 | 6/1988 | France . | |
| 3424580 | 11/1985 | Germany . | |
| 0009582 | of 1887 | United Kingdom ................... | 403/343 |
| 0902452 | 8/1962 | United Kingdom ................... | 415/230 |
| 2031090 | 4/1980 | United Kingdom ................... | 403/343 |
| 2131113 | 6/1984 | United Kingdom ................... | 411/403 |
| 8904419 | 5/1989 | WIPO . | |

Primary Examiner—Edward K. Look
Assistant Examiner—Christopher Verdier
Attorney, Agent, or Firm—Harness, Dickey & Pierce

[57] ABSTRACT

A coolant pump system features a pump impeller supported on a pump shaft without bearings, and an axially in-line drive shaft with bearings coupled to the pump drive shaft. The system minimally includes a pump body having a bore therein, a coolant pump impeller, a pump shaft passing through the bore and having the impeller mounted on one end thereof, and a bearingless seal shaft assembly disposed in the bore which prevents coolant from leaking out of the body around the rotating pump shaft. The outer end of the pump shaft and the drive shaft are designed to be quickly disconnected to allow simpler, easier, less expensive interconnection of or replacement of the coolant pump, should that ever be necessary. This interconnection mechanism may take the form of a socket with bayonet slot on one shaft and mating pin on the other shaft that fits in the slot, an in-line threaded stem on one shaft and complementary mating socket on the other shaft, or an in-line unthreaded stem on one shaft and a mating socket on the other shaft with a transverse fastener to secure the shafts from separating. This direct-coupled axial in-line design may be advantageously used with an electric drive motor, a chain-driven, belt-driven or gear-driven drive shaft.

35 Claims, 5 Drawing Sheets

U.S. PATENT DOCUMENTS

| | | | |
|---|---|---|---|
| 3,064,503 | 11/1962 | Fry | 403/376 |
| 3,367,465 | 2/1968 | Newman. | |
| 3,423,781 | 1/1969 | Henson. | |
| 3,507,129 | 4/1970 | Tarenskeen | 464/901 |
| 3,594,102 | 7/1971 | Oden. | |
| 3,796,507 | 3/1974 | Smykal et al. | 415/231 |
| 3,906,728 | 9/1975 | Kantz. | |
| 3,914,072 | 10/1975 | Rowley et al.. | |
| 4,074,662 | 2/1978 | Estes. | |
| 4,156,407 | 5/1979 | Moll et al.. | |
| 4,215,658 | 8/1980 | Smith, Jr. et al.. | |
| 4,469,053 | 9/1984 | Sakurai. | |
| 4,475,485 | 10/1984 | Sakakibara et al.. | |
| 4,502,291 | 3/1985 | Shelton et al.. | |
| 4,522,160 | 6/1985 | Speers et al.. | |
| 4,591,691 | 5/1986 | Badali. | |
| 4,630,573 | 12/1986 | Ogawa et al.. | |
| 4,643,135 | 2/1987 | Wunsche. | |
| 4,651,922 | 3/1987 | Noba. | |
| 4,677,941 | 7/1987 | Kurz. | |
| 4,691,668 | 9/1987 | West. | |
| 4,746,270 | 5/1988 | Hale et al. | 415/230 |
| 4,768,923 | 9/1988 | Baker | 415/230 |
| 4,836,147 | 6/1989 | Morris. | |
| 5,125,795 | 6/1992 | Suzuki et al. | 415/168.2 |
| 5,174,250 | 12/1992 | Lane | 415/229 |
| 5,275,538 | 1/1994 | Paliwoda et al.. | |
| 5,291,811 | 3/1994 | Goss | 411/404 |

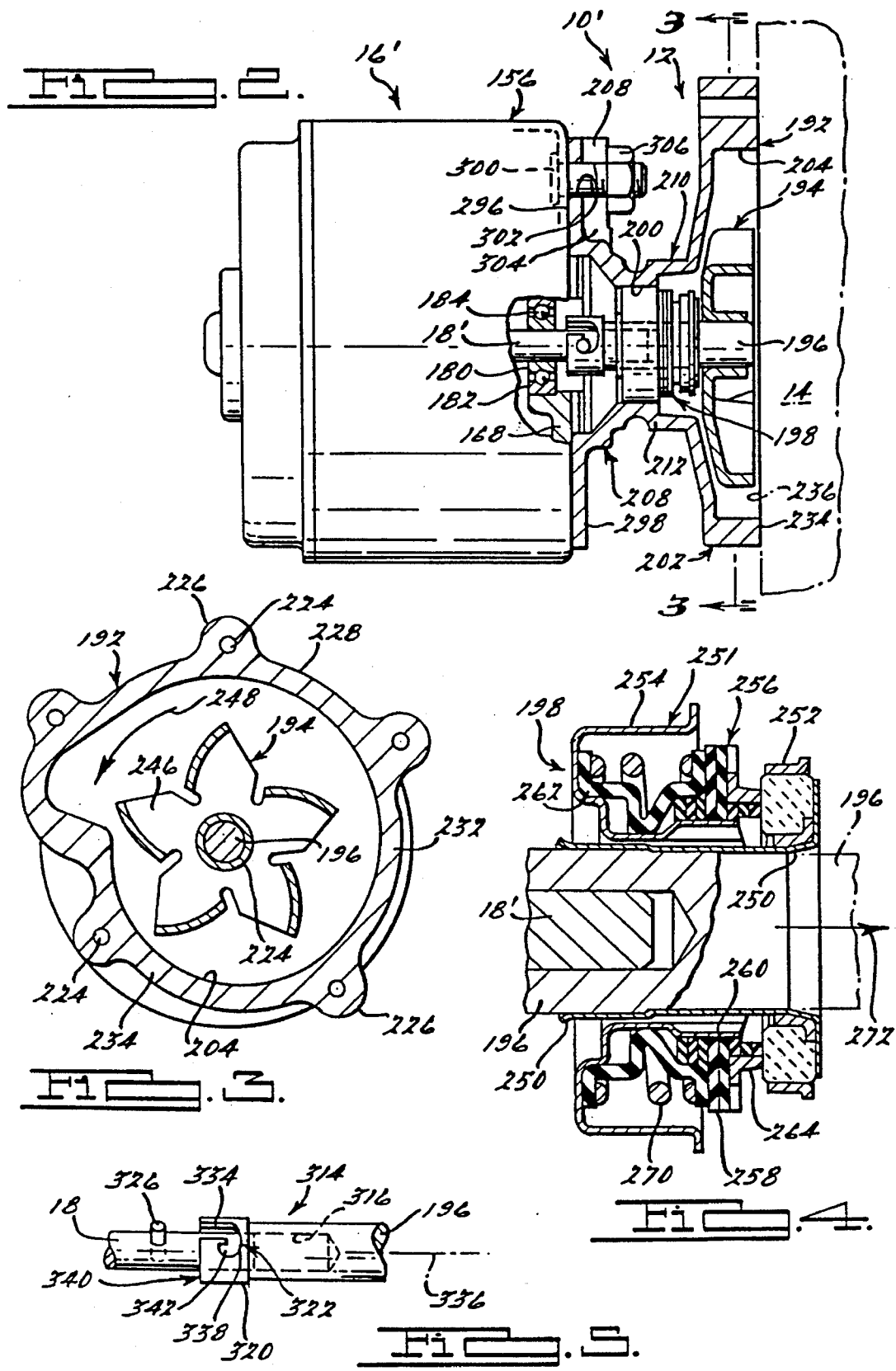

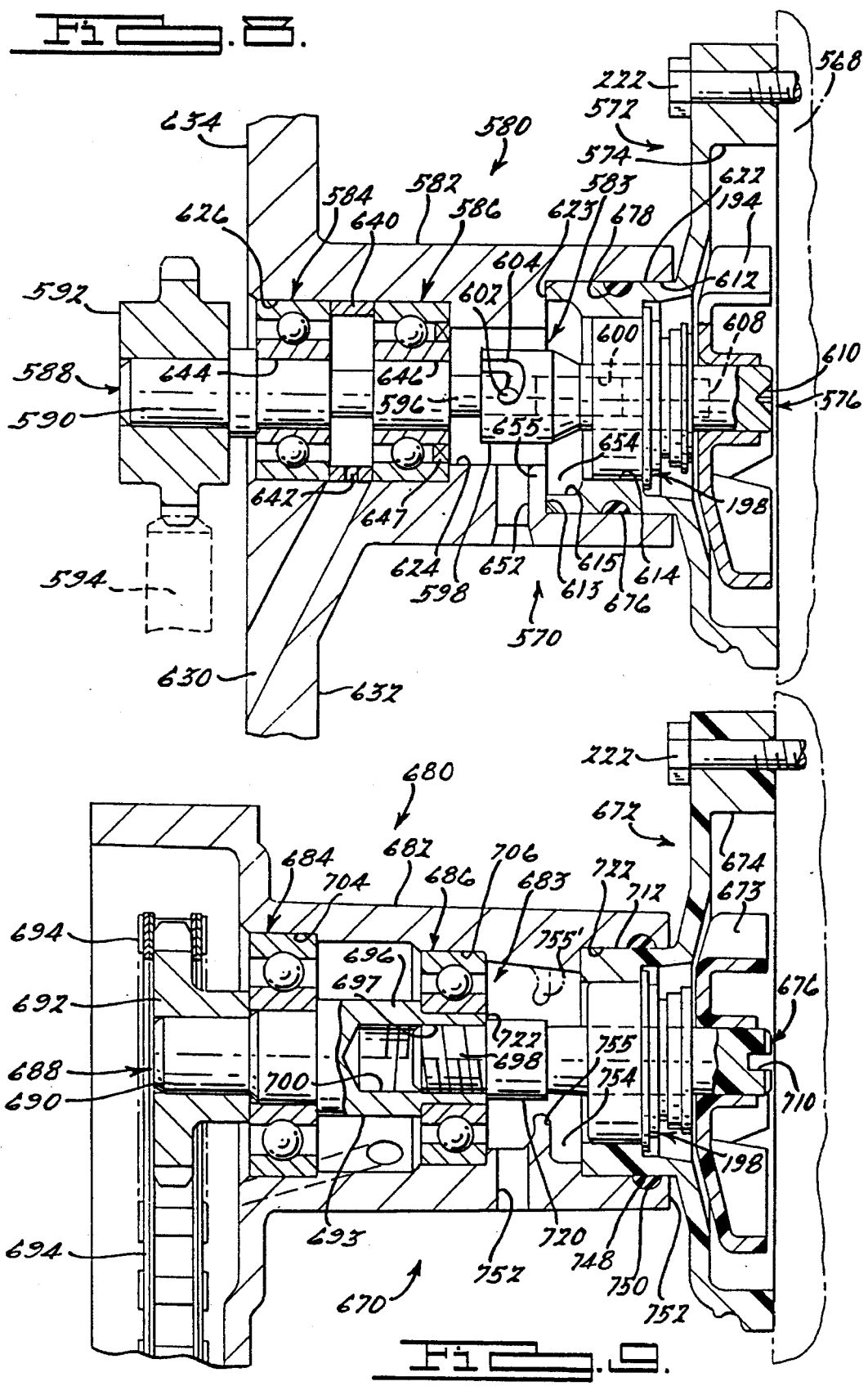

BEARINGLESS AUTOMOTIVE COOLANT PUMP WITH IN-LINE DRIVE

CROSS-REFERENCE TO RELATED APPLICATIONS

This application is a continuation-in-part of commonly assigned U.S. patent application Ser. No. 07/791,725 filed Nov. 14, 1991, now U.S. Pat. No. 5,279,505 which is continuation-in-part of commonly assigned U.S. patent application Ser. No. 07/549,742 filed Jul. 9, 1990, now abandoned, and the disclosures of these earlier applications are hereby incorporated by reference.

BACKGROUND OF THE INVENTION

1. Field of the Invention

The present invention relates in general to coolant pumping systems used with internal combustion engines or other vehicle power plants in automotive vehicles, and in particular to bearingless impeller-type coolant pump systems which have an easily decoupled in-line drive, and are specifically designed for use with internal combustion engines or other drive power plants in automotive applications.

2. Description of Related Art

In conventional water pump systems used on automobiles, a drive belt and pulley are used to provide the drive rotation to the coolant pump shaft. The coolant may be of any suitable type, such as the commonly used mixture of water and antifreeze. A chain and sprocket gear arrangement is sometimes used instead of a belt and pulley. Two sets of bearings are typically provided in the pump casing to resist the large external side load forces generated by either of these drive arrangements. As is well known, when these side load forces are considered, the overall forces experienced by the pump shaft are inherently unbalanced. On account of the unbalanced force vector to the pump shaft, it is necessary to suitably strengthen the pump assembly, pump shaft and its ball bearings to handle expected loads and overloads. This adds to the cost and weight of the coolant pump.

A common failure mode for water pumps is the failure or wear of the water pump bearings. Severe bearing wear often results in damage to the flexible coolant shaft seal assembly, which allows coolant to escape from the engine's cooling system, thus presenting further problems. If the pump bearings did not fail in the first place, many such failures of the flexible shaft seal assembly could be avoided, along with the resultant loss of engine coolant, and destruction of the pump shaft on account- of scoring and galling.

To alleviate problems such as side load forces associated with conventional water pump systems on automotive vehicles, coolant pump systems have been developed which utilize an in-line shaft support assembly wherein the drive shaft is coupled, in-line, to the pump shaft of a conventional coolant pump. Typically, the in-line coupling between the drive shaft and the pump shaft is accomplished by providing the mating end of the pump shaft with a socket including internal splines and the mating end of the drive shaft with a male spline. Additionally, two sets of bearings are used along the length of the pump shaft to assist in reducing the side load forces. During operation, the drive shaft of the motor rotates a drive sprocket for a drive chain which is attached over and rotates the extending sprocket assembly. This in turn causes rotation of the impeller pump shaft thus driving the impeller pump.

One problem with coolant pump systems which utilize interconnecting splines to attach the impeller pump shaft and a drive shaft is the noise generated at times during operation. The dynamic forces exerted on this system cause the splines to oscillate or move relative to each other which can result in excessive noise under certain conditions. To alleviate some of this noise, it is known to spring load the sprocket assembly to limit the amount of oscillation between the splines. This system, however, is less than ideal in that male and female splined ends are expensive to machine, and the noise is merely limited, while the overall cost of the side load reducing drive system is substantially increased.

Accordingly, it would be very beneficial to provide an alternative side-loaded pump system which solves most, if not all, of the foregoing problems. It would be highly desirable to eliminate the noise generated by the splined connection. It would also be beneficial to eliminate the two sets of bearings typically provided in the pump housing which in turn would lower the costs.

In light of the foregoing problems with conventional chain-driven coolant pumping systems, it is a primary object of the present invention to provide a coolant pump arrangement for an internal combustion engine which eliminates the splined connection between the pump shaft and the drive shaft assembly, and replace it with an inexpensive reliable mechanical coupling that is easy to connect and disconnect repeatedly.

It is another object of the present invention to provide a bearingless coolant pump arrangement which eliminates the double bearing set typically provided in the pump housing.

It is a further object of the present invention to provide a bearingless coolant pump with an in-line drive shaft support assembly which very substantially reduces if not entirely eliminates the external side loads on the pump shaft.

One more object of the present invention is to provide an automotive coolant pump system with an in-line drive shaft support assembly and a coupling mechanism which allows the pump shaft to be quickly and repeatedly coupled and uncoupled from the rest of the in-line drive shaft support assembly by hand or by using simple hand tools.

Still another object of the present invention is to provide an-line drive shaft support assembly and coolant pump assembly, each assembly having a housing and a shaft, wherein the housings are slidably interconnected along a common axis to prevent any movement in a direction transverse to the axis, and wherein the drive shaft and pump shaft are slidably or threadedly interconnected for synchronous rotation and also to prevent movement therebetween in a direction transverse to the common axis.

Yet another object of the present invention is to provide a coolant pump assembly wherein a coolant overflow well or basin is provided within a drive shaft support housing, in order to avoid conventional dripping of coolant on the ground when it leaks in small quantities past the flexible shaft seal of the coolant pump upon start-up or at other times.

A further object of the present invention is to provide a coolant overflow hole adjacent to the coolant overflow basin within the housing for accepting excess coolant.

SUMMARY OF THE INVENTION

In light of the foregoing problems and in order to fulfill one or more of the foregoing objects, there is provided, in accordance with a first aspect of the present invention, a coolant pump system for use with an internal combustion engine in which the one or two sets of bearings usually contained within the pump housing or pump cover have been eliminated altogether. The system comprises a coolant pump body provided with a bore passing therethrough and a chamber region normally filled with coolant during operation of the pump system. A coolant pump impeller is provided and is located at least partially within the chamber region of the pump body. The other portion of the pumping chamber may be formed in any suitable manner such as by a conventional metal casting bolted to the engine, or by a recess in the engine block itself as taught in U.S. Pat. No. 4,925,367.

The coolant pump impeller is mounted for rotation on a first end of the pump shaft positioned at least partially within the bore of the pump body. The second end of the pump shaft is adapted with a quickly released connection to an in-line drive shaft, as described below. The pump system further includes a bearingless seal assembly, located at least partially within the bore, for forming a leak-resistant flexible seal between the central portion of the pump shaft and the bore of the pump body, which prevents coolant from leaking past the pump shaft.

An in-line drive shaft support assembly is also provided as part of the coolant pump system. The support assembly includes a drive shaft support structure such as a housing made, of molded plastic or as a metal casting, for supporting a plurality of bearing sets spaced along the drive shaft which is arranged along a common axis with the pump shaft. A direct drive coupling connects the drive shaft to the pump shaft and includes a first connection member rigidly positioned at one end of the pump shaft, and a second connection member rigidly positioned at each end of the drive shaft adjacent the pump shaft connection member. This coupling means allows the two shafts to be connected and disconnected from one another in less than 30 seconds by hand or using hand tools, once access to the impeller end of the pump shaft is obtained.

The pump shaft is supported directly by the drive shaft without the use of bearings in the bore of the pump cover, since the pump shaft effectively constitutes a rigid coaxial extension of the drive shaft, and the drive shaft which is amply supported by the plurality of bearing sets. This pump shaft support and coupling arrangement allows the drive and pump shafts to be simply attached and decoupled, repeatedly if necessary, for any service purpose, such as replacement of a worn part or subassembly.

The in-line drive shaft extends between the pump shaft and a source for rotational power for the drive shaft. The drive shaft may have a pulley, sprocket or gear at its input end for allowing it to be belt-driven, chain-driven or gear-driven. Alternatively, as shown in the embodiments described in FIGS. 1 through 5, an electric motor shaft may be used as the drive shaft, with the electric motor providing both the source of rotational power and the plurality of bearing sets spaced along a common axis.

One of the advantages of the in-line coolant pump system with its separate drive shaft support housing is that the coolant pump can be easily serviced without disconnecting the chain drive from the sprocket on the drive shaft. The coolant pump may be more accessible and requires less effort to effect removal of the pump shaft or seal for repair or replacement. Typically, a mechanic seeks to replace only the working portions of the coolant pump. To do this with an in-line drive system of the present invention, it is only necessary to remove a few bolts holding the water pump body and/or the water housing to the engine, and then, once access to the impeller is thus gained, by hand or with hand tools, uncouple the water pump impeller from the drive shaft, and then slide the water pump body out of the bore of the support housing. In contrast, disconnecting a belt or chain from its pulley or sprocket may involve the removal of many bolts used to secure a belt or chain cover to the support housing, at a location where space in the engine compartment is severely limited. These and other advantages, objects and aspects of the present invention may be further understood by referring to the detailed description, accompanying figures, and appended claims.

BRIEF DESCRIPTION OF THE DRAWINGS

The drawings form an integral part of the description of the preferred embodiments and are to be read in conjunction therewith. Like reference numerals designate the same or similar components or features in the various Figures, where:

FIG. 2 is an enlarged partial cross-sectional view of FIG. 1 showing the motor housing and motor shaft and the pump body, the impeller, flexible face seal assembly, the pump shaft;

FIG. 3 is an cross-sectional view of the coolant pump taken along line 3—3 of FIG. 2 showing the location of the impeller within the coolant pump body;

FIG. 4 is an enlarged cross-sectional view of the face seal assembly shown in FIG. 2 taken along the longitudinal axis of the pump shaft;

FIG. 5 is an enlarged fragmentary view of a preferred quick-disconnect coupling mechanism between the drive motor shaft and the pump shaft;

FIG. 8 is a cross-sectional view of a second embodiment of the present invention, which is a bearingless coolant pump system with in-line drive that is shown being gear-driven, and which utilizes a bayonet connection between the pump shaft and the in-line drive shaft;

FIG. 9 is a cross-sectional view of a third embodiment of the present invention, which is a bearingless coolant pump with an in-line drive that is shown being chain driven, and which utilizes a threaded socket on the in-line drive shaft which is engaged by a threaded end of the pump shaft;

DETAILED DESCRIPTION OF THE PREFERRED EMBODIMENTS

Figure 1:
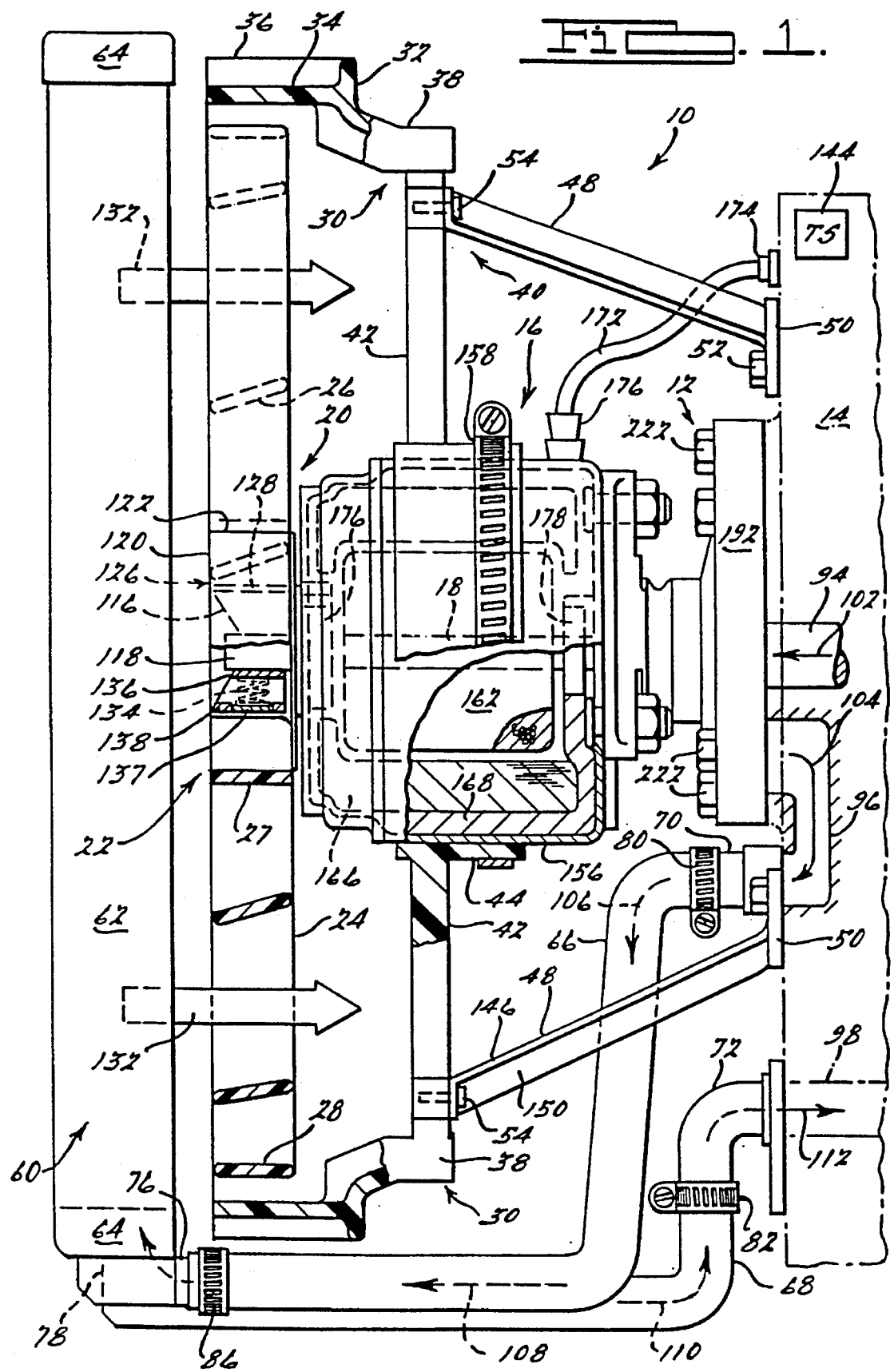
FIG. 1 is a simplified top view of a coolant pump system of the present invention which includes an electric motor (shown in partial cross-section) having a double-ended shaft, one end of which drives the coolant pump of the present invention, and the other end of which drives an engine cooling fan through a clutch assembly.

FIG. 1 is a simplified top view of the coolant pump system 10 of the present invention. The system 10 includes a coolant pump assembly 12 mounted to an engine block 14, an electric motor 16 having a double-ended shaft 18, a cooling fan assembly 20 including a conventional clutch assembly 22 and circular plastic fan 24 having multiple fan blades 26 which may be connected between an inner rim 27 and an optional outer circular rim 28. The system 10 may also include a cooling fan shroud assembly 30 which includes a cylindrical shroud 32 provided with an outer rim 34, rim-reinforcing ribs 36 and mounting flanges 38. The flanges 38 are connected to a shroud mounting assembly 40. The assembly 40 may include a plurality of spoke-like support members 42 that are equiangularly spaced about an inner rim 44 and 30 extend radially outwardly to the mounting flanges 38. The mounting shroud assembly 40 also may optionally include stabilizing brackets 48 with mounting pads 50. The brackets 48 are attached to the engine block 14 by suitable fasteners, such as bolts 52, and to the radially-arranged support members 42 by suitable fasteners, such as screws 54.

The FIG. 1 cooling system for the engine block 14 also includes a conventional radiator 60 including a core 62 between vertically arranged side manifolds 64. Conventional discharge and return hoses 66 and 68 carry coolant to and from the radiator 60. Suitable piping connections, such as straight engine discharge pipe 70 and 90-degree elbow discharge return pipe 72 and 90-degree elbow pipes 76 and 78, which serve as the radiator inlet and outlet, may be used in conjunction with conventional hose clamps 80, 82 and 86 to interconnect the hoses 66 and 68 between the radiator 60 and engine block 14. Within the engine block is a coolant pump inlet passage 94, coolant pump discharge passage 96, and radiator return passage 98 which may be formed in the block 14 in any conventional manner. Dashed arrows 102 through 112 show the flow of coolant from inlet passage 94, through the pump assembly 12, into pump discharge passage 96, through discharge hose 66 and into radiator 60, and then out return hose 68 to the return passage 98. The coolant is distributed from the passage 98 in conventional manner throughout the engine block through internal passageways which eventually connect to pump inlet passageway 94, thus completing the coolant flow circuit. A conventional thermostatically-operated check valve or diverter valve (not shown), an over-temperature relief valve (not shown), or any other conventional accessory or feature of engine cooling systems may be employed in the overall cooling system depicted in FIG. 1.

The clutch assembly 22 includes an inner rotating section 116 rigidly attached to the end portion 118 of electric motor shaft 18. The clutch 22 also includes an outer rotating section 120 which may have a cylindrical outer surface 122 to which the fan inner rim 27 is fastened. The clutch assembly 22 includes pressure plates or other engagement mechanisms 126 which upon being actuated squeeze together or otherwise engage at openings 128 to mechanically interconnect inner and outer sections 116 and 120 of clutch 22 so they rotate together. This causes the fan 24 to revolve in the direction of the motor, and draws air through the radiator core 62 and blows it into the engine block 14 as indicated by broad arrows 132.

The clutch assembly 22 may be any conventional or suitable type of clutch assembly used in connection with automotive cooling fans. Different types of clutch engagement mechanisms may be used in the clutch 22, including clutch plates thermally-actuated by bimetallic spring assemblies, electromagnetic powder clutch assemblies operated by an electrical signal provided through conventional electrical conductor arrangements, or a centrifugally-operated clutch mechanism. The latter mechanism may be as provided in any conventional manner, such as by use of return springs, such as spring 134, interconnected between inner annular ring 136 of the inner clutch section 116 and outer pressure plates 137 mounted between outer annular members 138 of section 116. The springs 134 are sized so that when the rate of rotation of inner section 116 exceeds a predetermined value, the pressure plates 137 engage and cause the fan 24 to rotate. When clutch assembly 22 is centrifugally-operated, the electric motor 16 is preferably a two-speed motor. In this manner, the clutch may be selectively actuated by increasing the speed of motor 16 from its low speed to its high speed, and selectively disengaged by switching the motor 16 from its high speed to its low speed.

If a thermally-actuated clutch mechanism is used, the clutch 22 turns on when the air 132 flowing through the cooling fan rises above a certain predetermined temperature. When an electrically-actuated clutch mechanism is used, a temperature switch 144 may be provided on the motor, in the engine block 14 (as shown), or at any other suitable location. The switch 144 provides an on-off electrical signal which controls when the electrically-operated clutch mechanism is engaged and disengaged. Of course, a more sophisticated electrical control circuit may be used to determine when the fan 24 is to run and when it will be off.

The fan shroud 30 helps increase the volume of air flow through the radiator core 62 on account of the rotation of fan 24. The fan 24 and shroud 30 may be made of conventional sheet metal or suitably high-strength, fatigue-resistant, molded plastic of the type commonly used for fans and fan shrouds in conventional automotive vehicles. Similarly, the mounting structure 40 and support brackets 48 may be made of metal or high-strength plastic. The spokes 42 and/or brackets 48 may include flat portions, such as portions 146 and 150, at an angle (such as ninety degrees) to one another for increased strength. The inner rim 44 of the mounting structure 40 may be connected to the casing or housing 156 of the motor 16 by any suitable means such as by screws or by a large tubing clamp 158 as shown.

FIG. 1 includes a partially cutaway view of the motor 16. Motor 16 includes an armature assembly including armature windings 162 and the motor shaft 18, a stator assembly 166 rigidly mounted to a motor frame 168 which is enclosed by the housing 156. The motor 16 may be a single-speed motor, but is preferably a multi-speed motor, such as a two-speed motor. A conventional electrical cable 172 with multiple conductors provides the electrical power through electrical connector assemblies 174 and 175 from the vehicle's electrical supply system to operate the motor 16. The motor preferably runs at the nominal vehicle supply voltage provided by the battery, which is typically 12 volts D.C.

The motor 16 also includes two conventional ball bearing sets 176 and 178. The bearing outer races are pressed or otherwise fastened into suitable cylindrical openings provided in the motor frame 168. The inner races are pressed or otherwise fastened onto motor shaft 18 so as to retain shaft 18 in place while permitting it to freely rotate. The inner and outer races 180 and 182 and ball bearings 184 of ball bearing set 178 are shown supporting motor shaft 18' in FIG. 2. Those in the art will appreciate that bearing sets 176 and 178 may alternatively employ roller bearings or any other suitable type of bearing device, including sleeve bearings, for securely supporting the motor shaft 18 for easy rotation.

FIG. 2 further illustrates the construction of the coolant pump assembly 12, and shows an alternative electric motor 16' having a single-ended motor shaft 18'. Thus, FIG. 2 represents a second coolant pump system 10' of the present invention. System 10' does not utilize its electric motor to drive the cooling fan. Accordingly, the system 10' need not be located adjacent to the radiator 60 of the vehicle, but instead may be located elsewhere within the vehicle's engine compartment, such as on either side of or the back of the engine block 14. However, the configuration of the coolant pump assembly 12 for the systems 10 and 10' may be the same.

FIGS. 1 and 2 show a preferred construction of the coolant pump assembly 12. The assembly 12 includes a pump body 192, a conventional impeller 194 pressed or otherwise fastened onto a pump shaft 196, and a spring-loaded seal assembly 198 used to prevent coolant from escaping through a cylindrical bore 200 in the pump body.

The pump body 192 has three sections. It includes a coolant cover section 202 which forms the impeller rotation chamber 204. The pump body 192 also includes an electric drive motor mount section 208 configured to provide complete support for the electric drive motor 16 or 16'. The pump body 192 also includes a central section 21 0 having a toroidal wall portion 212 which defines the bore 200 that is integrally connected to and disposed between the cover section 202 and motor mount section 208 of the pump body. The pump body 192 as just described is preferably a one-piece metal casting of a suitable material such as aluminum or malleable iron, although it may be any other suitable material, including a high strength, high-temperature-resistant plastic. The thickness of the various walls or reinforcement members (if any) provided between or within the various sections 202, 208 and 210 of the body 192 will depend upon the type of material, the size and weight of the electrical motor, whether the cooling fan assembly 20 and fan shroud assembly 30 are used, and whether the pump body 192 is the sole structural support for these members or whether reinforcement members such as brackets 48 or the like are provided to secondarily support the motor, or the fan and shroud assemblies. In the embodiment disclosed in FIG. 2, where a fan is not driven by the motor 16', it is preferred to support the electric motor solely by the pump body 192 as shown, since this decreases manufacturing and assembly costs.

FIG. 3 shows a preferred arrangement for the pump body 192 and chamber 204. The pump body may be mounted by several mounting bolts 222 (preferably five in number) which extend through bores 224 on lobes 226 around the periphery 228 of the pump body 192. The wall portions 232 between wall lobes 226 are made thick enough to provide the necessary rigidity to prevent coolant from leaking out between the machined flat face surface 234 of the pump body and the corresponding machined flat face 236 of the engine block 14. Conventional gasket material (not shown) may be used to seal any gaps between these two flat machined surfaces.

FIGS. 2 and 3 show a conventional impeller 194, which preferably is of one-piece metal stamping having an annular inner rim pressed onto the shaft 196. The impeller 194 is preferably balanced about the axis of pump shaft 196 and has equiangularly-spaced blades 246 at the ends thereof to drive the coolant into discharge passage 96 as the impeller 194 rotates in the direction indicated by arrow 248. Suitable impellers are typically manufactured from 1008 through 1016 steel, and may be purchased from A.J. Rose Company of Cleveland, Ohio.

FIG. 4 shows a preferred shaft seal assembly 198, taken in cross-section so as to show portions of the pump shaft 196 and motor shaft 18'. Motor shaft 18' is identical to motor shaft 18 except it does not include a second output shaft on the fan side of motor 16'. The assembly 198 typically includes three stamped brass cup members, including a cylindrical cup 250 and large and small annular cups 251 and 252. The outer surface 254 of cup 251 is press-fit into bore 200 of the pump body 192. The seal assembly 198 also includes a layered stack 256 of annular gaskets 258 arranged as shown to form a sliding o surface with the inside cylindrical wall portion 260 of large cup 250. Flexible seal members 262 and 264 complete the sealing arrangement between the larger cup 250 and smaller cup 252. A squat helical wire spring 270 is disposed as shown about flexible annular seal 262, and serves to press the smaller cup 252 and pump shaft 196 in a direction away from the motor, as indicated by arrow 272. Face seal assemblies, such as the seal assembly 198 shown in FIG. 4, have long been used in the automobile coolant pumps, and may be purchased from a number of companies, such as John Crane Company of Morton Grove, Ill. However, we are unaware of any such seal assemblies used to help keep a pump shaft and drive shaft together in the manner of the present invention.

FIGS. 1 and 2 show that the motor 16 or 16' has an end mount configuration. In other words, the generally cylindrical end face 296 of the motor 16 facing the pump body 192 is connected to a suitable mounting flange 298 of the mount section 208 of the pump body 192. Suitable fasteners, such as threaded bolt studs 300, are anchored in the housing 156 and frame 168 of the motor 16. The studs 300 pass through slightly larger holes 302 in reinforced regions 304 of the mount section 208 of pump body 192. Suitable fasteners such as locking nuts 306 are tightened down on the studs 300. Theoretically, only one mounting connection need be made between the housing of the motor 116 and the mount section 210 of the pump body, if it were strong enough to properly support the electric motor and prevent deflection thereof as the motor generates torque through the shaft. However, as best shown in FIG. 1, two or preferably three (or more) connection members like studs 300 are spaced around the periphery of the mount section 210.

The electric motor 16 may be set to rotate at a fixed speed or may be driven by a suitable electric drive system so as to have variable speed. As previously explained, a simple two-speed motor is preferred. For example, the low speed might be set to rotate at 2400 rpm and provide roughly 60 liters per minute of coolant flow at normal pressures within the cooling system and a high speed of 3000 rpm which may provide approximately 85 liters per minute coolant flow. By selecting different impeller sizes and/or designs and different electric motor sizes and/or designs known in the art, the capacity and pressure of the pump system and the rate of rotation of the motor and pump shaft of the present invention may be varied as desired for any given cooling application for an internal combustion engine.

FIGS. 2 and 5 show a preferred method of connecting the electric motor drive shaft 18 to the pump shaft 196. The pump shaft 196 is preferably larger in diameter than the motor shaft, thus permitting the coupling end portion 314 thereof to have a socket 31 6 machined or otherwise formed therein. The rim portion 320 of the socket end 31 4 may be enlarged to provide further strength for a bayonet slot 322 which is formed therein.

FIG. 5 is an enlarged fragmentary view of the pump end of the motor shaft 18 and the socket end portion 322 of the pump shaft 196. The motor shaft 18 includes a transverse pin 326 which is pressed or otherwise placed into a corresponding hole pre-drilled into the shaft 18. The pin fits into the bayonet slot 322 which includes a linear portion 334 running substantially parallel to the axis 336 of the pump shaft 196 and an arcuate portion 338. Portion 338 begins near an inward end of the linear portion 334 and extends transversely away therefrom, and curves back toward the outward end 340 of the socket 31 6 to form a recessed area 342 to receive and captivate the pin 326 on the shaft 18. The helical spring 270 of the shaft seal assembly 198 shown in FIG. 4 biases the coupling into the recessed area 342. The electric motor 16 drives the pump impeller 194 in one direction only, as shown by arrow 248 in FIG. 3. Thus the coupling mechanism of the present invention illustrated in FIGS. 2 and 5 inherently tends to remain coupled together, since there are no significant forces which tend to uncouple it during operation of the coolant pump systems 10 or 10'. Thus, those in the art will appreciate that the coupling mechanism shown in FIGS. 2 and 5 constitutes a direct-drive coupling means for connecting the pump shaft 196 to the electric drive motor. Shafts 18 and 196 are coaxially aligned, and due to the close fit and interlocking relationship between the male portion of motor shaft 18 and the female end portion 322, the two shafts effectively operate as one rigid shaft. Since the motor shaft 18 is amply supported on both ends by bearing sets 176 and 178 which are sized to accommodate the additional load presented by pump shaft 196, the pump shaft 196 does not need to have its own set of bearings within the coolant pump body as is found in conventional coolant pumps in automotive applications. In other words, the coolant pump system 10' shown in FIG. 2 is a bearingless coolant pump system, and the flexible shaft seal assembly 198 may be said to be a bearingless means located at least partially within the bore of the pump body for forming a leak-resistant, flexible seal between the central portion of the pump shaft and the bore 200 of the pump body. This design may also be used in the FIG. 1 pump system, or if desired, a ball-bearing set may be disposed in bore 200 of pump body 192.

An important advantage of the direct-drive coupling mechanism described with respect to FIGS. 2 and 5 is that it allows the first and second connection portions rigidly mounted to the motor shaft and pump shaft to be quickly interconnected to permit the motor 16 to drive the impeller 194, and to be quickly disconnected from one another. Further, these interconnections may be made by hand by simply grabbing the impeller 194 by one hand and pushing it in a direction opposite arrow 272 of FIG. 4 while simultaneously rotating the impeller 194 in the direction of arrow 248. This will retract pin 326 from the recessed area 342 of bayonet slot 332, and orient it in linear slot portion 334, which permits the two shafts to be disconnected. Such easy connection and disconnection of the coupling members should serve to reduce assembly and component replacement costs, and to permit faster and easier replacement of the water pump or electric motor, should this prove necessary in the field.

Figure 6:
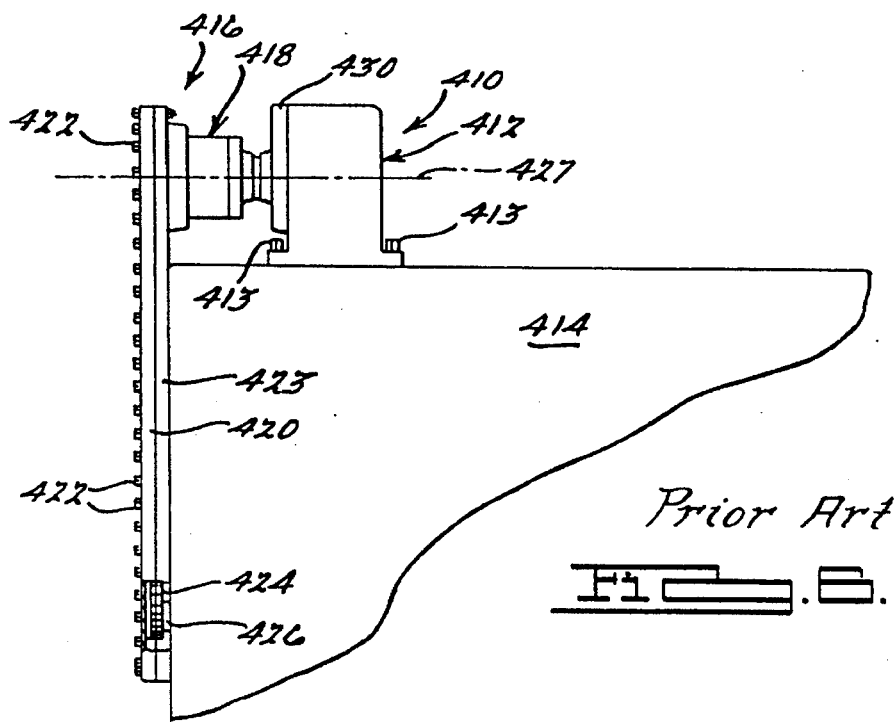
FIG. 6 is a plan view of a chain-driven in-line coolant pump system developed by another and now in conventional use which has a chain drive housing and cover that supports an in-line drive support assembly.

FIG. 6 shows a prior art coolant pump system 410 which includes a coolant pump assembly 412 mounted by bolts 413 to an engine block 414. The pump 412 is driven by a chain drive assembly 416. The assembly 416 includes a drive shaft support housing 418, a drive chain cover 420 fastened by numerous bolts 422 to an elongated portion 423 of the chain drive support housing 418. A double-link endless chain 424 which runs within the cover 420 runs on two spaced-apart sprockets within a chamber 425 formed within and by the cover 420 and the elongated housing portion 423. The chain 424 is driven by a shaft 426, which may be a crank shaft or cam shaft, extending outwardly from the engine block 414. The shaft 426 includes a suitable sprocket gear (not shown) for supporting and driving the chain 424.

Figure 7:
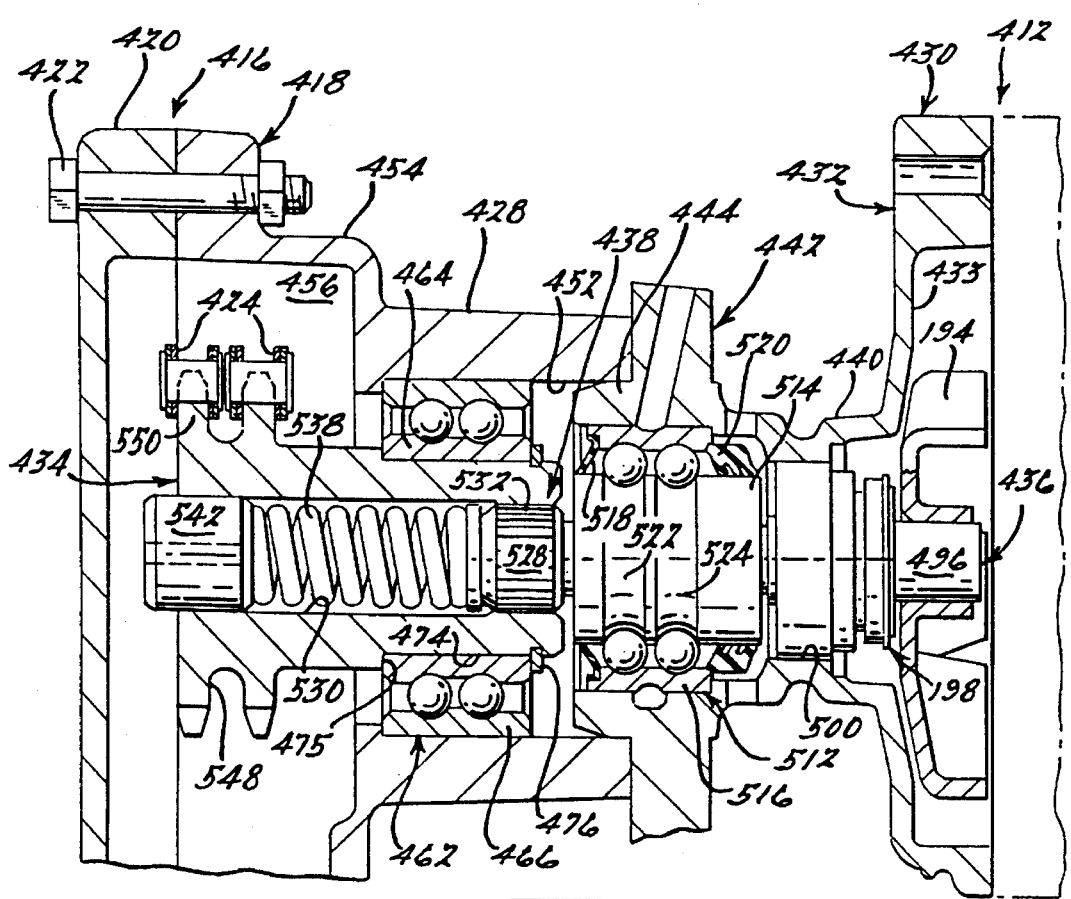
FIG. 7 is a enlarged cross-sectional view of the FIG. 6 pump system showing the internal structure of the pump system, including in-line shaft support assembly having a drive shaft in-line and a conventional coolant pump assembly having a pump shaft supported by a double-track ball bearing set.

FIG. 7 is an enlarged cross-sectional view, taken in a vertical plane through the central axis of the pump shaft in FIG. 6, which shows the internal construction of the drive shaft support assembly 416, including the drive shaft support housing 418, its annular bearing support section 428, and all of the components therein. FIG. 6 also shows the pertinent portions of the internal construction of the pump body 430 of the pump assembly 412. A drive shaft 434 runs through the housing 418 and is coaxially coupled to the pump shaft 436 using a splined connection arrangement at location 438, which will be further described below.

The pump body 430 includes a coolant cover section 432 having an internal chamber 433 for the pump's impeller. The pump body 430 also includes a throat section 440, and a bearing support section 442 having a tapered generally cylindrical end portion 444 which engages an internal bore 452 of the housing section 428.

The housing structure 418 has a chain chamber portion 454 having an internal chamber 456, which forms part of the chamber 425 that the chain 424 runs in. The housing assembly 416 includes a dual-track ball bearing set 462 having inner and outer races 464 and 466. The inner race 464 is pressed onto a cylindrical surface 474 of the drive shaft 434, and contacts shoulder 475. The outer race 466 is pressed into engagement with the internal bore 452 of the housing section 428. A retaining ring 476 holds the inner race 464 in place on the drive shaft 434.

The pump assembly 412 includes an impeller 194 pressed onto a pump shaft 436 at location 496. A conventional spring-loaded seal assembly 198 is installed on the pump shaft 434 and fits snugly into the bore 500 of the pump body section 440 to prevent coolant from escaping.

In the bearing support section 442 of the coolant pump body 430, there is located a dual-track ball bearing set 512. The bearing set has inner and outer races 514 and 516 respectively pressed on the pump shaft 436 and the internal bore of section 442. A single annular wiper seal 518 and a triple annular wiper seal 520 are provided to keep contaminants out of the ball bearing tracks 522 and 524. The end 528 of the pump shaft 436 opposite the impeller 194 has a male splines formed in it.

The drive shaft 434 has a coaxial bore 530 formed in it, with female splines being machined into the reduced diameter end 532 of the bore. The splined end 532 of the drive shaft 434 engages the male splines 528 of the pump shaft 436. A helical spring 538 located drive shaft bore 530 bears against the end 528 of the pump shaft 436. An annular plug 542 pressed into the bore 532 of the drive shaft 434 holds the spring 538 in place within the bore 532. The central hole in the plug 542 allows lubricant to pass through the plug.

The input end of the drive shaft 434 has a sprocket gear 548 integrally formed thereon, and the chain 424 is shown being carried by the teeth 550 of the sprocket 448. The helical spring 538 is provided in order to attempt to reduce the noise generated at the splined connection when the pump shaft 436 is driven by the drive shaft 434.

FIG. 8 shows a cross-sectional view of a second embodiment of a bearingless coolant pump system 570 of the present invention. System 570 uses an in-line drive with a bayonet connection between the drive and pump shafts similar to that shown in FIGS. 2 and 5. The system 570 includes a coolant pump assembly 572 having a pump body 574, a pump shaft 576, and a conventional impeller 194 pressed or otherwise fastened onto pump shaft 76. The system 570 also includes a drive shaft support assembly 580, which includes a support housing 582 having an internal chamber 583, spaced-apart bearing sets 584 and 586 supported by the housing 582, and a drive shaft 588 supported by bearing sets 584 and 586. The shaft 588 is driven at its input end 590 by gear 592 pressed or otherwise suitable fastened thereto. The gear 592 may be driven by an input gear 594, shown in phantom, by an endless chain (not shown) or by a suitable endless cogged belt (not shown).

The drive shaft 588 includes a cylindrical first male connection member 596 which plugs into a second connection member 598, in the form of a socket, on the pump shaft 576. The socket includes the coaxial bore 600. The socket end 598 of the pump shaft has an enlarged head so that the male member 596 can fit within bore 600, preferably to a depth of at least about one to two centimeters, to help ensure the two shafts do not wobble relative to one another during operation, but instead fit together so snugly that they in effect act as one solid shaft. A pin 602, similar to pin 326 shown in FIG. 5, is inserted in a hole in the male member 596, and engages a corresponding inwardly curled slot 604 like slot 322 in FIG. 5. If desired, another slot 604 may be provided exactly on the opposite side of the socket, so that the pin 602 may be extended an equal amount beyond both sides of male member 596, and engage both slots. In this manner, the coupling arrangement comprised of first and second connection member 596 and 598 will be completely dynamically balanced.

The coaxial bore 600 within pump shaft 596 may, if desired, be drilled or otherwise formed deep into the pump shaft, as shown by the extra deep region 608. This has the benefit of lightening up the pump shaft 576, thus reducing the weight to be supported on the end of the drive shaft 588.

On the end of pump shaft 576 opposite the socket end 598 is a star-shaped indentation 610 for receiving the tip of a self-centering screwdriver such as a philips-head screwdriver. The pump shaft 576 may be made of metal (as shown) or of high-strength molded plastic material. A metal pump shaft may be machined from round stock or made from a powdered metal piece pre-formed into a substantially finished shape, with only minimum finish machining being done to the bore 600 or slot 604, or for the purpose of dynamically balancing the shaft.

The pump body 574 includes a first external cylindrical surface 612 and a first internal bore 614. The internal bore 614 which receives the metal cup of the shaft seal assembly 198. A second slightly larger bore 615 is provided to form a larger internal chamber and to reduce weight. The external cylindrical surface 612 ends at squared-off face 613. By "squared-off", we mean the face 613 resides in a common plane perpendicular to the common axis. The external cylindrical surface 612 and internal bore 614 are concentrically arranged about the common axis and define the location of the axis of the pump shaft 576.

The drive shaft support housing 582 includes at its output end thereof a corresponding internal bore 622 which terminates at squared-off annular shoulder 623. Bore 622 is sized to snugly and slidably receive the first external surface 612. The flat face 613 and shoulder 623 contact one another, thus providing a positive location of the pump body 574 relative to drive shaft support housing 584 in a longitudinal direction (i.e., along the common axis of the drive and pump shafts. The depth of engagement of cylindrical surface 612 within the bore 622, as measured in the longitudinal direction, is preferably in the range of at least one to two centimeters. The clearance between the mating cylindrical surfaces 612 and 622 is preferably in the range of about 0.0002 to about 0.001 inch, although somewhat larger clearances may be used if desired. The longitudinal overlap of between these cylindrical mating surfaces is in an amount sized to ensure that the internal bores of the pump body 574 and the support housing 582 are coaxially aligned. The concentric mating surfaces 612 and 622 also function to prevent any movement in a direction transverse to the axis of the pump or drive shafts. Having flat face 613 and shoulder 623 that fully seat against one another also helps ensure the interconnected portions of 574 pump body and support housing 582 are coaxially aligned and properly positioned. The net effect of using overlapped mating concentrically arranged cylindrical surfaces and one or more internal concentric cylindrical surfaces, such as bore 626, for the bearing sets which support the drive shaft 588 and bore 614 to support the flexible seal assembly 194, is to guarantee that the axes of drive shaft 588 and the pump shaft 576 are in substantially perfect axial alignment. This is in turn serves to reduce to an absolute minimum any dynamic imbalance which might otherwise occur due to errors in alignment of the axes of drive shaft and pump shaft.

In a similar manner, the axially aligned internal bore 600 of pump shaft 576 receives the male connection member 596 of the drive shaft 588 to a depth, such as one to two centimeters, and with sufficient close clearances, sufficient to prevent any movement transverse to the common axis between the pump and drive shafts when these shafts are interconnected, as shown in FIG. 8. Thus, two separate sets of coaxial mating surfaces cooperate to ensure that the pump and drive shaft remain in perfect coaxial alignment, even though the pump shaft 576 does not include its own internal bearing set for support.

An oil return hole 630 may be drilled or otherwise provided through the lower flange portion 632 of the support housing 582. Flange portion 632 and/or the upper flange portion 634 of the housing 582 may be suitably fastened to the engine block or other structure. A gear cover, like cover 420 with cover multiple fastening bolts 422, as shown in FIG. 6, may be provided to totally enclose the drive gears 592 and 594 (or drive belt or drive chain, if gears are not used).

The pair of single-track bearing sets 584 and 586 are spaced longitudinally from one another in the enlarged bore portion 626 of drive shaft support housing 580. The outer races of bearings sets 584 and 586 may be press-fit, each into their proper location, within the bore 626. The amount of space in between the bearing sets 584 or 586 may optionally be regulated through the use of an generally cylindrical metal sleeve 640, if desired. The sleeve 640 may be perforated or slotted, as shown at bottom location 642, to allow oil used to lubricate the bearings to drain to the oil return hole 630. The inner races of the bearing sets 584 and 586 are pressed or otherwise placed on the cylindrical surfaces or diameters 644 and 646 of the pump shaft 588. The bearing sets 584 and 586 are preferably conventional ball-bearing sets, but may also be roller, thrust or sleeve bearings or any other suitable type of bearing device which securely supports the in-line drive shaft 588 for easy rotation in response to rotational forces applied through the input gear or sprocket 592.

Engine oil splashed up by the gear, belt or chain drive to bearing 584 may be used to lubricate the bearing sets 584 and 586, if desired. Bearing set 586 may be of the totally sealed, permanently lubricated type, to prevent oil from passing through it. Alternatively, bearing 586 may be sealed on the output side only, using a conventional internal bearing seal (diagrammatically shown as X-marked annulus 647) to prevent oil from leaking through bearing 586. Other known shaft sealing means may also be used as a technique for preventing oil from escaping through the bearing 586 to the chamber 583, where the connection members 596 and 598 are located.

The second through sixth embodiments of the present invention, respectively shown in FIGS. 8 through 12, each preferably employ a drive shaft support housing and coolant pump body which slide together as generally illustrated in FIG. 8 in order to establish and maintain a perfectly coaxial in-line coupling between the easily-disconnected drive shaft and pump shaft. In the various embodiments of the present invention, it is preferred to keep the connection members of the drive shaft and the pump shaft, the concentric surfaces 612 and 622, and the flat faces 613 and 623 free of contaminants, especially dirty water or salt spray from the road, in order to minimize opportunities for corrosion to form or other problems to develop. Extensive corrosion of metal parts could make it more difficult to uncouple the parts from one another. To help ensure that contaminants are kept out, an annular ring 676 of sealing material may be employed in the vicinity of mating cylindrical surfaces 612 and 622. The sealing ring may take the form of an O-ring made of neoprene, Viton or Buna-N rubber or other suitable material. An annular groove 678 may be provided in the external cylindrical surface 612 of the pump shaft 574. This 0-ring 676 may be used to help ensure a fluid-tight seal between the pump body 574 and the housing 582 to prevent the entry of the water sprayed up in the engine compartment as the vehicle travels down a wet road, drives through puddles, or is run through a car wash. Other sealing arrangements may also be used, such as coating the bore portion 622 or cylindrical surface 612 with a liquid sealing agent prior to slipping them together. Also, during the initial start-up and check-out of the coolant pump system, a conventional coolant system sealing agent may be dissolved in the coolant so that in the event of leakage, the leaking coolant will carry sealing agent into the gap between the mating surfaces where it will harden, thus sealing the gap against further leaks. Finally, especially with close-fitting parts, it may be unnecessary to provide gaskets, 0-rings or sealing material.

The various embodiments of the present invention preferably employ an impeller-type coolant pump with a conventional flexible coolant shaft seal assembly, since this design is cost-effective and widely accepted. With conventional flexible shaft seal assemblies, there is, at times, a small amount of coolant which leaks past this seal assembly for a brief period of time. This may happen at start-up, or when debris or particles suspended in the engine coolant work their way under the seal, etc. Thus, in conventional water pump designs, a small coolant drain hole through the pump housing is normally provided on the dry side of the flexible coolant shaft seal assembly, to allow a coolant escaping under the seal to drip out.

In the various embodiments of the present invention, such a small drain hole is provided in combination with a unique "coolant overflow" dam structure, which will shortly be described. Basically, this arrangement enables a small amount of coolant leaking past the flexible seal shaft assembly to be collected in an internal basin behind a wall or dam within the coolant pump system, where it may evaporate without dripping out of the pump system. In this regard, the drain hole in the second through sixth embodiments of the present invention might be better called a coolant overflow hole, since only the coolant which flows over the dam structure will exit through the hole.

In FIG. 8, the drain hole 652 interconnects the internal chamber 583 to atmosphere. In all of the embodiments of the present invention, the drain hole preferably intercepts the internal chamber at substantially the bottom of the chamber, so as to minimize the opportunity for water that is sprayed or splashed into the engine compartment to enter the chamber 583, and thus possibly contaminate the bearing 586, seal 198, or the connection between the shafts. This is most easily accomplished by having the coolant overflow hole 652 be directed straight down, as shown in FIG. 8. In those embodiments of the invention where access to the coupling members through the drain hole is not required, the hole may be connected to the bottom of the chamber 583 at any angle that is about 90 degrees or less from the vertical. The hole may be even formed as a thin slot or in an arcuate path, if desired, to further reduce the possibility of water from the outside entering into the chamber.

FIG. 8 shows one construction for creating an internal basin or well to collect a small amount of coolant leaking past the flexible seal 198 that is used to seal the pump shaft and pump housing. In FIG. 8, there is an internal basin 654, located near the coolant overflow hole 652. The basin is formed behind the dam or wall 655. The wall 655 is present since the diameter of bore 624 of the drive shaft support housing 580 is less than the diameter of the bore 615 of the pump housing. This allows the bottom-most portion of annular shoulder 613 in the vicinity of hole 652 to act as a dam, behind which limited amount of coolant may collect. If sufficient coolant flows past the flexible seal 198, basin 654 will fill up and overflow, with the excess coolant running out of coolant overflow hole 682. Since the amount of coolant which escapes past a flexible seal (when it leaks at all) is typically less than one or two milliliters, this small amount of fluid can be captured by appropriately sizing internal basin 684. Due to the elevated temperature within the engine compartment, the coolant pump system is normally quite warm, and this escaped coolant collected in basin 654 will evaporate quickly. Thus, the volume of basin 654 can be filled again and again, as long as for example at start-up, if that is the next time there will a minor temporary coolant leak past the seal 198.

Providing an internal basin to collect small amounts of leaking coolant can be quite important, as will now be explained. Some car owners are disturbed to see even a small puddle of coolant forming beneath their car. The owner may think that this unexpected small leak of coolant emanating from his or her car is a sign that bigger problems with the coolant system and/or coolant pump are imminent. Accordingly, the car owner may seek to have the car serviced by a mechanic to take care of this perceived problem, before truly serious engine repairs are needed. However, these very minor and temporary coolant leaks past the flexible seal assembly are not known to be a problem in and of themselves. Further, they are not known to indicate that there is a larger problem looming. But, since a car owner is likely not to know this, the puddle of coolant may well generate unnecessary concern and expense. An uninformed or unscrupulous mechanic may advise the concerned car owner that "the water pump is going bad; you better let me replace or repair it before you have real trouble". Even a car dealer fully aware of the true insignificance of such leaks is not immune from wasting time and money due to such leaks, especially on new cars under full warranty. The owner of a car exhibiting this coolant leak problem may insist that the dealership check it out, and may even exaggerate the extent of the problem to ensure the dealer does so. With the internal basin provided in the second through sixth embodiments of the present invention, the unwarranted worry, time and expense of unnecessary coolant system inspections and/or repairs due to small temporary leaks at the flexible seal assembly should be virtually completely avoided.

A major advantage of the various coolant pump drive systems of the present invention is that coolant pump assembly can be easily disassembled, and the coolant pump replaced, without disconnecting the drive shaft support housing from its drive gear (or drive chain or belt). For example, in the FIG. 8 embodiment, the coolant pump housing 568 is decoupled from the pump body 574 by loosening bolts 222, of which there are typically only three or four. Thereafter, the pump housing 568 is removed from the engine block (see FIG. 6). Once again, there should only be a few bolts to remove to take off the coolant pump housing 568. Once the pump housing is moved out of the way, the pump shaft 576 and its impeller 194 can be grabbed with one hand and pushed in while rotating it, such that the transverse pin 602 retracts from the curved slots 604 (i.e., the bayonet-style slots previously discussed). The impeller 194 and pump shaft 576 may be then pulled away from the in-line drive shaft 588, which takes the pump body 574 with it. The de-coupling of the shafts takes less than 30 seconds, once access is gained to the impeller 194. The pump body 574 can then be easily slid out of the bore of the support housing. To reinstall, the process is simply reversed. Such an easy disconnection and attachment of the coupling members and the coolant pump body and the support housing should serve to reduce assembly and component replacement costs in coolant pump systems, and permit faster and easier replacement of the coolant pump body assembly 574 and/or shaft seal 198, if this should prove necessary.

FIG. 9 shows a third embodiment of the present invention, namely in-line coolant pump drive system 670. For convenience, the reference numerals in FIG. 9 are generally the same as in FIG. 8, except for being 1 00 higher. Where components or features are identical, the same reference numbers are generally used as in FIG. 8.

The system 670 includes a coolant pump assembly 672 having a pump body 674, and a conventional-shaped impeller 673 pressed onto or formed integrally with a pump shaft 676. The system also includes a drive shaft support assembly 680, which includes a support housing 682 having an internal chamber 683, spaced-apart bearing sets 684 and 686, and a drive shaft 688 supported by the bearing sets 684 and 686. The shaft 688 is driven at its input end 689 by a chain sprocket 692 having multiple teeth. The sprocket 692 in turn is driven by a single-link endless chain 694 that may be connected through another sprocket to a drive source, for example, an engine shaft, like shaft 426 shown in FIG. 6.

The pump body 674, impeller 673, and pump shaft 676 may be made of metal, or may be made, as shown, of high-strength, temperature-resistant plastic material impervious to attack by conventional automobile coolants and resistant to other solvents present in automotive environments, such as motor oil, gasoline, and battery acids. These kinds of plastic materials are well-known in the automotive industry and need not be further specified here. The use of such plastic materials allows the weight of the coolant pump assembly 672 to be reduced. It also helps reduce machining requirements, since many features of these plastic parts can be molded to finish dimensions using conventional molding techniques. The amount of machining, if any, required on these plastic parts will thus be minimal. If strength considerations are a problem at the bolts 222, conventional reinforcing sockets made of metal may be imbedded at the time of molding or afterwards into the plastic material used to form the pump body 674.

The drive shaft 688 includes a first cylindrical female connection member 696 having a socket 697, preferably provided with internal threads. The second connection member 698 on the pump shaft 676 takes the form of a male connection member, with complementary o threads formed thereon. The threaded socket 697 of first connection member 696 is formed in a coaxial bore 700, which, as shown, may be made deeper than necessary to receive member 698, thereby reducing the weight of the drive shaft 688.

The drive shaft 688 has four distinct sections having cylindrical surfaces formed concentrically about the axis of the drive shaft. The leftmost section shown in FIG. 9 supports the sprocket 692, the second adjacent section receives the inner race of first bearing set 684, the third section 693 is located between the bearings, and the fourth section receives the inner race of the second bearing set 686. The internal shoulders on either side of section 693 of the drive shaft 688 provide positive stops for locating the inner races of bearing sets 684 and 686. The inner races of bearing sets 684 and 686 are pressed onto the drive shaft 686. The outer races of bearings 684 and 686 are pressed into or assembled with permanent epoxy adhesive material assembled into matching cylindrical bores 704 and 706 of the support housing 682. The bores 704 and 706 are concentrically arranged about and define a common axis for the drive shaft 688.

The pump shaft 676 is inherently dynamically balanced, since it is symmetrical about its own axis. The pump shaft 676 has an enlarged cylindrical portion 720, whose right shoulder (as viewed in FIG. 9) acts as a positive stop, since it contacts the annular end face 722 of the drive shaft 688. In this manner, the degree of insertion of the male connection member 698 of pump shaft 676 into the threaded socket 697 of the drive shaft 688 is controlled to achieve the desired position of the flexible shaft seal assembly 198 relative to the pump body 672.

The in-line pump drive system 670 of FIG. 9 employs mating bore 71 2 on the drive housing 682 and cylindrical surface 722 on the pump body 674 which are concentrically arranged for the purpose of ensuring coaxial alignment of the coolant pump body 672 and the drive shaft support housing 682, just like in the FIG. 8 embodiment.

In the FIG. 9 embodiment, the axially aligned internal bore 697 of the drive shaft 688 receives the male connection member 598 of the pump shaft 576 to a depth, such as one to two centimeters, sufficient to prevent any movement between the two shafts transverse to the common axis. Further, the direction of the threads of the connection members is selected to ensure that normal rotation of the pump and drive shaft will tighten, rather than loosen, the interconnection of the shafts.

The internal chamber 683 within the support housing 682 is vented to atmosphere through coolant overflow hole 752. An internal basin 754 is provided behind wall portion 755 which provides the dam structure extending upwardly preferably about 0.4 centimeter to about 0.8 centimeter toward the common axis above the lowest point of the basin floor. This dam structure 755 may optionally be provided if desired as an annulus of material which partially encircles and divides the internal chamber 683, as suggested by upper section 755 shown in phantom.

The drive shaft support housing 682 is preferably machined from a metal casting for strength. Finish machining of its internal bores is used to establish the final dimensions of internal bores and location of internal shoulders. By casting the support housing 682, the dam structure 755 can easily be formed at very little extra additional cost, without any additional finish machining. Also, an 0-ring 748 may be placed in an annular internal groove 750 provided in the internal bore 722 at any suitable location, such as near the end face 752 of the support housing 682, as shown as in FIG. 9.

The pump shaft 676, at the end thereof opposite the connection member 698, may have a straight slot 710 for receiving a straight-blade screwdriver tip. In this manner, a common screwdriver may be used to loosen the connection members from one another during disassembly of the coolant pump system 570 for any reason, such as service or replacement.

Figure 10:
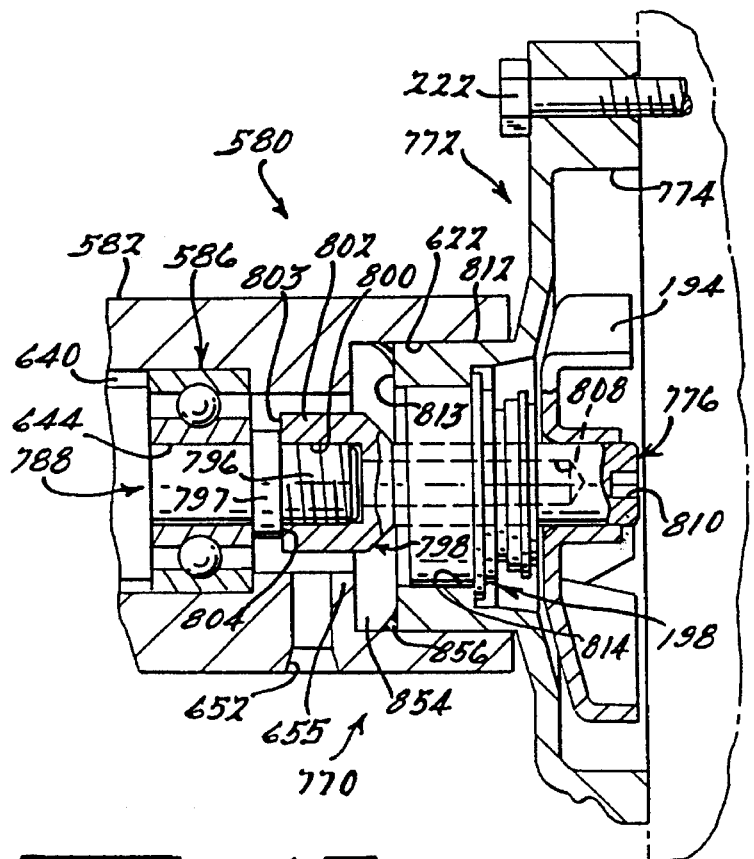
FIG. 10 is a fragmentary cross-sectional view of a fourth embodiment of the present invention, which is a bearingless coolant pump system with an in-line drive having a threaded socket on the pump shaft which is engaged by a threaded stud on the in-line drive shaft.

FIG. 10 shows a partial cross-sectional view of a fourth embodiment of a bearingless coolant pump system 770 of the present invention. System 770 uses an in-line drive with a threaded interconnection between the drive and pump shafts. This interconnection is similar to that shown in FIG. 9, except that the drive shaft has a threaded male end, and the pump shaft has a threaded socket end. These two connection members of course still function as the quick-disconnect connection members, capable of being put together or taken apart in less than thirty seconds. The system 770 includes a drive shaft support assembly 580 as shown in FIG. 8. The description of support assembly 580 need not be repeated here, except where pertinent to explaining the differences. The system 770 includes a coolant pump assembly 772 having a metal pump body 774, a pump shaft 776, and a conventional impeller 194, connected to the pump shaft 776.

The drive shaft 788 of FIG. 10 is identical to the drive shaft 588 shown in FIG. 8, except for its output end, which has a first threaded cylindrical male connection member or stud 596, and an enlarged cylindrical section 797 adjacent to the threaded end section 796. The threaded stud 796 plugs into a second connection member 798 on the pump shaft 776, which is in the form of a socket. The socket member 798 includes coaxial bore 800, and has an enlarged head 802, so that the large threaded stud 796 can fit within the bore 800, preferably to a depth of at least about one to two centimeters. The connection members 796 and 798 in this embodiment are threaded, and are preferably tightened against one another, to ensure that the two shafts do not wobble relative to one another during pump operation. The abutting surfaces 803 and 804 when tightened against one another provide further mechanical stiffness across the connection members 796 and 798. Also, this tightening positively locates the pump and drive shafts with respect to one another in a longitudinal direction as well as a radial direction. Further, the length of threaded stud 796 may even be reduced to between about 0.4 centimeter and about 0.8 centimeter if desired, on account of the increased rigidity between shafts provided by this threaded interconnection.

On the end of the pump shaft 776 opposite the enlarged head 802 is a hexagonally shaped socket 810 for receiving the hexagonal tip of a hand tool, such as an Allen wrench. To reduce the weight of pump shaft 776, elongated coaxial bore 808 may be provided, if desired, within the pump shaft 776, as shown by dotted lines in FIG. 10.

In the coolant pump system 770 of FIG. 10, the cylindrical bore 622 of the housing 582 is slidably engaged by the cylindrical outer surface 812 of the pump body 774. This provides the desired coaxial alignment of the pump body and housing previously described with respect to the FIG. 8 embodiment. In FIG. 10, embodiment, the annular end face 813 of the pump body 774 is a short distance, such as about 0.2 centimeter to about 1.0 centimeter away from the annular internal shoulder 623 of the support housing 582. This leaves an annular gap between the face 813 and shoulder 623. The lower portion of this annulus forms the internal basin 854 to catch small amounts of coolant which leak past the flexible shaft seal assembly 198 positioned within bore 814 of the pump body 774. Only when the amount of coolant in internal basin 854 exceeds the height of dam structure 855 will coolant run out of the overflow hole 652. A sealing material 856 shown in the corner between bore 622 and end face 813 may optionally be provided to ensure the coolant flowing into basin 854 does not leak out through any small gap which may exist between bore 622 and cylindrical pump surface 812. In the FIG. 10 embodiment, the precise longitudinal relationship between the support housing 582 and pump body 774 is determined externally, by the mechanical interconnections of the support housing 582 and the pump body 774 to the engine block. To the extent that this longitudinal varies slightly, any such variance will be taken up by the flexible shaft seal assembly, which is able to move slightly in a longitudinal direction. The FIG. 10 embodiment also has the advantage of providing a larger internal coolant capture basin 854 than the embodiments of FIGS. 8 and 9.

Figure 11:
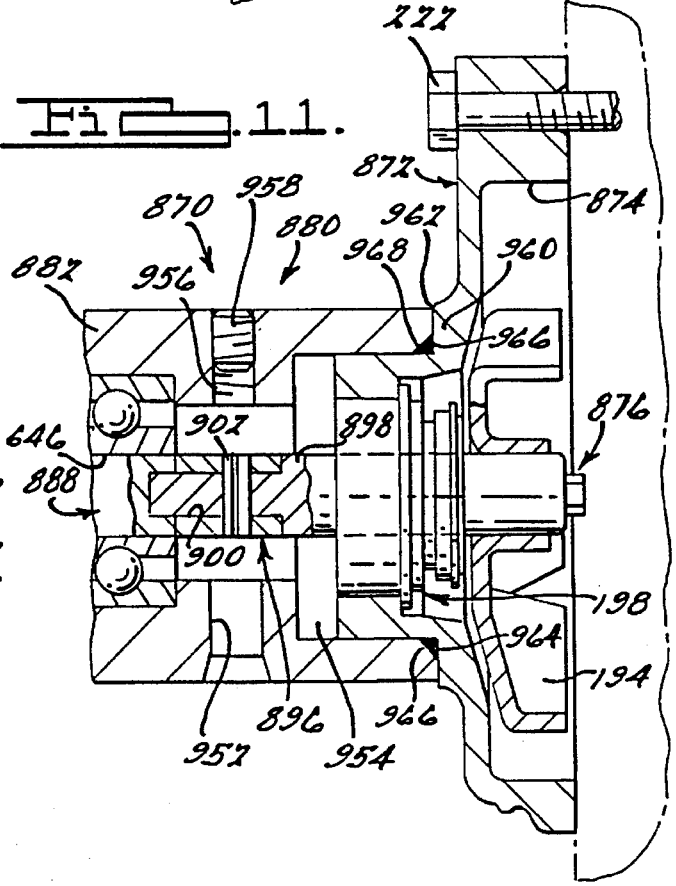
FIG. 11 is a fragmentary cross-sectional view of a fifth embodiment of the present invention, which is a bearingless coolant pump system with an in-line drive that uses a transverse pin member to secure the connection between an in-line drive shaft socket and an unthreaded male stem extending from a pump shaft.

FIG. 11 is a partial cross-sectional view of a fifth embodiment of a bearingless coolant pump system 870 of the present invention. System 870 uses an in-line drive with an unthreaded socket-stud interconnection between the pump shaft and drive shaft that is secured by a transverse member such as a roll pin. The system 870 uses a drive shaft support assembly 880 which includes a support housing 882. Support assembly 880 is substantially identical to the support assembly 580, including the support housing 582, shown in FIG. 8, except for certain modifications that are depicted in FIG. 11, and which will shortly be explained. The system 870 includes a coolant pump assembly 872 having a pump body 874, a pump shaft 876, a conventional impeller 194 located on pump shaft 876.

The drive shaft 888 of the drive shaft support assembly 880 includes a cylindrical female connection member 896 which receives a second male connection member 898 of the pump shaft 876, which male member is in the form of an unthreaded stud. The socket end 596 of the drive shaft does not have an enlarged head. The coaxial bore 900 within the female connection member 896 is preferably about one to two centimeters long, to help ensure that the two coupled shafts do not wobble relative to one another during operation. A transverse connection member 902, which may be a spring-steel roll pin or a removable rivet, is inserted in a transverse hole drilled or otherwise formed through the two connection members 896 and 898. The transverse member 902 is preferably inserted into the position shown through the coolant overflow hole 952, which hole can be enlarged as shown to make this insertion operation easier to perform. An optional hole 956 in the support housing 882 may be provided to allow the pin 902 to be pushed out of or inserted into the connection members of the two shafts. The hole 956 may be closed up with a plug 958, which may take the form of a screw. If desired, the hole 956 may be threaded, and a head (not shown) may be provided on screw 958.

On the end of the pump shaft 876 opposite the connection member 898 is a shaped male portion 910 for receiving a wrench driver having a corresponding female mating shape. Similarly, the connection member 898 may be a female portion 810 for receiving a corresponding male mating shape. For example, the shaped female portion may be a transverse slot adapted for receiving a tip of a straight-blade screwdriver, a star-shaped indentation adapted for receiving a self-centering screwdriver, or other combinations where a hand-tool may be temporarily connected for manually rotating the pump shaft.

In the FIG. 11 embodiment, the pump housing 874 is shown to have an enlarged wall portion 960 with a flat annular face 962 which abuts the flat annular end 964 of the support housing 882. This establishes the degree to which a support pump body 884 and support housing 882 may be pushed together in longitudinal direction (i.e., along the common axis). The cylindrical mating surfaces of the pump body and support housing also help ensure perfect coaxial alignment. An internal chamfer 966 may be provided adjacent end face 962 of support housing 882. This annular space may be occupied by an 0-ring or a sealing agent 968. This annular ring seals the cylindrical concentric connections against corrosion due to water or salt spray.

Figure 12:
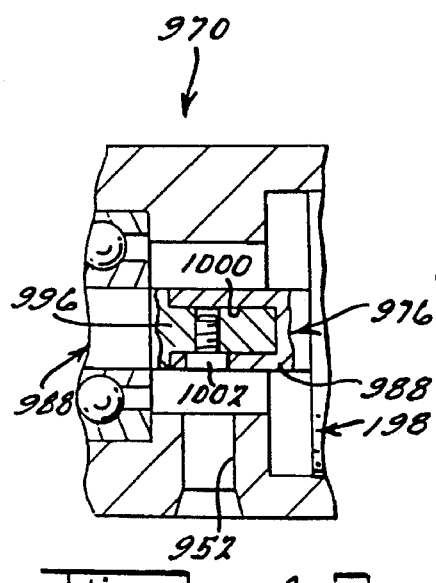
FIG. 12 is a fragmentary cross-sectional view of a sixth embodiment of the present invention, which is a bearingless coolant pump system of the present invention with an in-line drive, similar to the embodiment of FIG. 11, but with a set screw securing a socket end of the pump shaft to the unthreaded male stem extending from the drive shaft.

FIG. 12 shows a partial cross-sectional view of a sixth embodiment of a bearingless coolant pump system 970 of the present invention. This system 970 is substantially identical to the system 870 described with respect to FIG. 11, except for those areas shown in FIG. 12. In particular, the drive shaft 988 has a unthreaded stud member 996 which is interconnected to a second female connection member 998 of pump shaft 976. The second connection member 998 is in the form of an unthreaded socket having a bore 1000 which receives the stud member 996. A transverse hole is drilled into one side of the socket end of connection member 998. The smaller transverse hole is provided in stud member 996. These two holes receive a set screw 1002 as shown in FIG. 12, in order to keep the drive shaft 988 and pump shaft 976 locked together during operation of the coolant pump system 970. The screw 1002 is inserted into the holes present in connection members 996 and 998 through the coolant overflow hole 952.

An important advantage of the in-line coupling mechanism described with respect to FIGS. 8 through 12 is that they allow first and second connection portions to be quickly connected and disconnected from one another. Such easy connections and disconnections of the coupling members should serve to reduce assembly and component replacement costs, and to permit faster and easier replacement of the coolant pump, should this prove necessary.

The various embodiments of the present invention have been discussed above in conjunction with an automotive vehicle having an internal combustion engine. However, it should be appreciated that the simple rugged in-line drive coolant pump systems of the present invention can profitably be used in automotive vehicles powered by batteries or still other alternative energy sources. Such automotive vehicles often require a coolant pump, and thus would clearly stand to benefit by the advantages and lower cost of the bearingless in-line drive coolant pump systems of the present invention.

Armed with the teachings set forth above, those in the art will appreciate that the various features described with respect to the individual embodiments of the present invention may be combined in different ways. For example, the all-plastic construction for the pump body, the impeller, and the pump shaft, as disclosed in the FIG. 9 embodiment, may be employed if desired in the other embodiments of the present invention. Also, specific arrangement for supporting the spaced-apart bearing sets in one embodiment may be adapted and used with a different embodiment. Further, the type of hand tool connection provided on the impeller end of the pump shaft may be varied as desired. Also, V-belts or still other drive arrangements may be used to power the in-line drive shaft within the systems of the present invention.

The foregoing detailed description shows that the preferred embodiments of the present invention are well suited to fulfill the objects stated above. It is recognized that those skilled in the art may make various modifications or additions to the preferred embodiments chosen to illustrate the present invention without departing from the spirit or scope of the invention. Accordingly, it is to be understood that the patent protection sought and to be afforded hereby should be deemed to extend to the subject matter defined by the appended claims, including all fair equivalents.

We claim:

1. An in-line drive coolant pump system for an internal combustion engine or other power plant of an automotive vehicle comprising in combination:

means for pumping coolant including a pump housing cover having at least one bore passing therethrough, a coolant pump impeller, a coolant pump shaft unsupported within the means for pumping coolant upon which the impeller is mounted for rotation which projects through the bore of the pump housing cover, a flexible shaft seal means for forming a leak-resistant flexible barrier about the shaft and bore to keep coolant from leaking out through the pump housing cover;

a drive shaft for driving the pump shaft and arranged along a common axis with the pump shaft;

a plurality of bearing sets spaced along the drive shaft for supporting the drive shaft for rotation about the common axis;

a drive shaft support structure supporting the plurality of bearing sets; and direct drive coupling means for connecting the drive shaft to the pump shaft, including a first connection member rigidly positioned at one end of the pump shaft, and a second connection member rigidly positioned at one end of the drive shaft, said members being arranged to be interconnected to permit the drive shaft to drive the impeller in at least a first direction, and to be disconnected from one another, and wherein the pump shaft is supported directly by the drive shaft without the use of bearings in the bore of the pump cover, whereby the pump shaft effectively constitutes a rigid coaxial extension of the drive shaft which is supported by the plurality of bearing sets, but which can be decoupled from the drive shaft for a service purpose.

2. An in-line drive bearingless coolant pump system as in claim 1, wherein the first and second connection members can be coupled and uncoupled from one another in under thirty seconds using only hand tools.

3. An in-line drive bearingless coolant pump system as in claim 1, wherein one of the first and second connection members is a female member having a socket therein, and the other connection member is a male member which is inserted into the socket.

4. An in-line drive bearingless coolant pump system as in claim 3, wherein the female member has a bayonet slot therein, and the male member has a pin projecting transversely therefrom which fits into the bayonet slot for securing the shafts together.

5. An in-line drive bearingless coolant pump system as in claim 4, further comprising biasing means for retaining the transverse pin within the slot means.

6. An in-line drive bearingless coolant pump system as in claim 3, wherein the socket includes a threaded axial bore portion and the male member includes a mating threaded portion for screwing into the threaded axial bore portion.

7. An in-line drive bearingless coolant pump system as in claim 6, wherein the socket is formed on the drive shaft, and the male member is formed on the pump shaft.

8. An in-line drive bearingless coolant pump system as in claim 6, wherein the socket is formed on the pump shaft, and the male member is formed on the drive shaft.

9. An in-line drive bearingless coolant pump assembly as in claim 6, wherein the end of the pump shaft opposite the first connection member includes a hand-tool attachment means for rotating the pump shaft in first and second directions, the first direction being for tightening the threaded portions of the socket and male member together, and the second 5 direction being for untightening the socket and male member.

10. An in-line drive bearingless coolant pump assembly as in claim 9, wherein the hand-toot attachment means is a tool connection portion selected from the group consisting of: (a) a transverse slot adapted for receiving a tip of straight-blade screwdriver, (b) a star-shaped indentation for adapted receiving a self-centering screwdriver, (c) a shaped female portion adapted for receiving a wrench driver having a corresponding male mating shape, and a (d) shaped male portion adapted for receiving a wrench driver having a corresponding female mating shape, whereby one of these hand-tools may be temporarily connected to the tool connection portion for rotating the pump shaft in the first and second directions as desired.

11. An in-line drive bearingless coolant pump system as in claim 3, wherein the direct drive coupling means includes a third connection member extending at least partially through said male and female members for coupling the first and second connection members together for synchronous rotation in both directions.

12. An in-line drive bearingless coolant pump system as in claim 11, wherein the third connection member is an interlocking fastener selected from the group consisting of (a) a set screw, (b) a screw with a head, (c) a straight short cylindrical pin, (d) a roll pin, and (e) a rivet.

13. A coolant pump system as in claim 11, wherein the third connection member extends substantially completely through the male and female members for coupling the first and second connection members together.

14. An in-line drive bearingless coolant pump system as in claim 11, wherein:
the first connection member has a first transverse hole extending at least partially therethrough,
the second connection member has a second transverse hole extending at least partially therethrough, with the first and second transverse holes being arranged on their respective connection members such that, when the connection members are assembled to make the pump shaft an effective rigid coaxial extension of the drive shaft, the first and
second transverse holes are aligned with one another, and
the third connection member being inserted into the first and second transverse holes of the first and second connection members, thereby interlocking the two shafts together for synchronous rotation, and preventing the two shafts from moving longitudinally relative to one another.

15. An in-line drive bearingless coolant pump system as in claim 11, wherein the first and second transverse holes extend completely through their respective first and second connection members.

16. An in-line drive bearingless coolant pump system as in claim 1, which includes an electric motor having a housing, for driving the coolant pump shaft, wherein:
the drive shaft is the shaft of the electric motor;
the shaft support structure includes the housing of the motor;
the pump housing cover is made of a casting; and
the coolant pump system further includes a mounting means having at least one rigid connection member anchored on one side thereof to the motor and another side thereof to the coolant pump cover.

17. An in-line bearingless coolant pump system as in claim 2, wherein the drive shaft is driven by an endless chain or an endless belt.

18. An in-line bearingless coolant pump system as in claim 2, wherein the drive shaft is gear driven.

19. An in-line drive coolant pump system for an internal combustion engine or other power plant of an automotive vehicle comprising:
(1) means for pumping coolant including a pump housing cover having:
(a) a first internal bore passing therethrough,
(b) a first external cylindrical surface concentrically arranged about at least a portion of the first internal bore;
(c) a coolant pump impeller,
(d) a coolant pump shaft unsupported within the means for pumping coolant upon which the impeller is mounted for rotation which projects through the bore of the pump housing cover, and
(e) a flexible shaft seal means for forming a leak-resistant flexible barrier about the shaft and bore to keep coolant from leaking out through the pump housing cover;
(2) a drive shaft for driving the pump shaft, wherein the drive shaft is arranged along a common axis with the pump shaft;
(3) a drive shaft support housing having a first internal bore sized to snugly receive the first external cylindrical surface of the pump housing cover to align the pump housing cover and support housing along the common axis and prevent movement in any direction transverse to the common axis between the pump housing cover and the drive shaft support housing;
(4) a plurality of bearing sets spaced along the drive shaft for supporting the drive shaft for rotation about the common axis, the bearing sets being supported by the drive shaft support housing; and
(5) direct drive coupling means for detachably connecting the drive shaft to the pump shaft for synchronous rotation in at least a first direction.

20. An in-line drive bearingless coolant pump system as in claim 19, wherein:
the direct drive coupling means includes a first connection member rigidly positioned at one end of the pump shaft, and a second connection member rigidly positioned at one end of the drive shaft, said members being arranged to be interconnected to permit the drive shaft to drive the impeller in at least a first direction, and to be disconnected from one another, and the pump shaft is supported directly by the drive shaft without the use of bearings in the bore of the pump cover, whereby the pump shaft effectively constitutes a rigid coaxial extension of the drive shaft which is supported by the plurality of bearing sets, but which can be decoupled from the drive shaft for service.

21. An in-line drive bearingless coolant pump system as in claim 19, wherein:

the drive shaft support housing includes at least second and third internal bores concentrically arranged about the common axis, with the first, second and third bore portions being successively longitudinally arranged along the common axis so that the first internal bore is closest to the pump cover, and the third bore portion is farthest from the pump cover, the second bore being sized larger than the connection members of the drive shaft and pump shaft, and the third bore being sized to support at least one of the plurality of bearing sets.

22. An in-line drive bearingless coolant pump system as in claim 19, wherein:

the first cylindrical external surface of the pump housing cover has a longitudinal dimension less than the longitudinal dimension of the first bore of the drive shaft support housing, such that when connected for normal pump operation, a pocket exists within the first bore where a small amount of coolant leaking past the flexible shaft seal means during any small temporary leak of the coolant pump system collects therein, without leaking out of the coolant system in the form of one or more visible drops of coolant dripping from the coolant pump system.

23. An in-line drive bearingless coolant pump system as in claim 22, wherein the first cylindrical external surface of the pump housing extends by at least one centimeter in longitudinal dimension into the first internal bore of the drive shaft support housing, and the annular region has a longitudinal dimension of at least 0.2 centimeters.

24. An in-line drive bearingless coolant pump system as in claim 22, further comprising:

means for sealing against coolant leakage between mating surfaces of the annular region of the first cylindrical external surface of the pump housing and the first internal bore of the drive shaft support housing.

25. An in-line drive bearingless coolant pump system as in claim 22 further comprising: means for sealing against coolant leakage, which includes:

an annular groove formed in at least one of the mating surfaces formed by the first cylindrical external surface of the pump housing and the first internal bore of the drive shaft support housing, and an annular sealing ring positioned within the annular groove.

26. An in-line drive bearingless coolant pump system as in claim 22, wherein the drive shaft support housing includes:

an internal annular region for capturing a small amount of coolant leaking past the flexible shaft seal means, and a coolant overflow hole located between the first internal bore of the support housing and the one of the bearing sets closest to the pump shaft, the overflow hole being arranged for disposing of excess coolant beyond the capacity of the annular region to hold same during normal operation of the coolant pump system.

27. An in-line drive bearingless coolant pump system, comprising:

(1) means for pumping coolant including a pump housing cover having:

(a) a first internal bore passing therethrough, (b) a first external shaped surface generally concentrically arranged about at least a portion of the first internal bore;

(c) a coolant pump shaft unsupported within the means for pumping coolant upon which the impeller is mounted for rotation which projects through the bore of the pump housing cover, and (d) a flexible shaft seal means for forming a leak-resistant flexible barrier about the shaft and bore to keep coolant from leaking out through the pump housing cover;

(2) a drive shaft for driving the pump shaft and arranged along a common axis with the pump shaft;

(3) a drive shaft support housing having a first internal shaped portion sized and shaped to snugly slidably receive and detachably mate with the first external shaped surface of the pump housing cover to align the pump housing cover and housing support structure along the common axis and prevent movement in any direction transverse to the common axis between the pump housing cover and the drive shaft support housing;

(4) direct drive coupling means for detachably connecting the drive shaft to pump shaft for synchronous rotation in at least a first direction, and (5) means for sealing the mating surfaces between the pump housing cover and the drive shaft support housing, and wherein the drive shaft support housing includes an internal region within the first internal shaped portion for capturing a small amount of coolant leaking past the flexible shaft seal means, and a coolant overflow hole located near the first internal shaped portion, the overflow hole being arranged for disposing of excess coolant beyond the capacity of the internal region to hold same during normal operation of the coolant pump system.

28. An in-line drive bearingless coolant pump system as in claim 27, wherein:

a generally annular groove is formed in at least one of mating surfaces formed by the first shaped external surface of the pump housing and the first internal shaped portion of the drive shaft support housing, and the means for sealing the mating surfaces includes an annular sealing device positioned with the generally annular groove.

29. An in-line drive bearingless coolant pump system as in claim 27, further comprising a plurality of bearing sets spaced along the common axis, supported by the drive shaft support housing and directly supporting the drive shaft for rotation; and wherein:

the direct drive coupling means includes a first connection member rigidly positioned at one end of the pump shaft, and a second connection member rigidly positioned at one end of the drive shaft, said members being arranged to be interconnected to permit the drive shaft to drive the impeller in at least a first direction, and to be disconnected from one another, and the pump shaft is supported directly by the drive shaft without the use of bearings in the bore of the pump cover, whereby the pump shaft effectively constitutes a rigid coaxial extension of the drive shaft.

30. An in-line drive bearingless coolant pump system as in claim 29, wherein:

the direct drive coupling means includes a third connection member extending at least partially through said male and female members for coupling the first and second connection members together for synchronous rotation in both directions, and the first, second and third connection members and the coolant overflow hole are all arranged such that the third connection member is insertable into the first and second connection members through the coolant overflow hole.

31. An in-line drive bearingless coolant pump system as in claim 27, wherein:

the direct drive coupling means includes a third connection member extending substantially completely through the first and second connection members for coupling the first and second connection members together for synchronous rotation in both directions, and a transverse through-passage is provided through the drive shaft support housing in a position which is alignable with the third connection member when the third connection member is installed into the first and second connection members, such that the transverse through-passage is usable to provide an access port through which the third connection member is inserted and removed as desired from the first and second connection members.

32. An in-line drive bearingless coolant pump system as in claim 31, wherein a portion of the transverse through-passage also serves as a coolant overflow hole for coolant leaking past the flexible shaft seal means.

33. An in-line drive bearingless coolant pump system as in claim 27, wherein:

the first external cylindrical surface of the pump housing cover extends sufficiently into the first internal bore of the drive shaft support housing to form an elongated seal, thereby precluding the entrance of contaminants into the drive shaft support housing.

34. The in-line drive bearingless coolant pump system of claim 33, wherein:

the drive shaft support housing includes an aperture extending therethrough to the first internal bore to assist in discharging contaminants from the drive shaft support housing prior to contacting the plurality of bearing sets.

35. An in-line drive bearingless coolant pump system as in claim 29, wherein:

an oil return line hole extends into the drive shaft support housing near the plurality of bearing sets.

\* \* \* \* \*

UNITED STATES PATENT AND TRADEMARK OFFICE
CERTIFICATE OF CORRECTION

PATENT NO. : 5,482,432
DATED : January 9, 1996            Page 1 of 2
INVENTOR(S) : Paliwoda et al.

It is certified that error appears in the above-indentified patent and that said Letters Patent is hereby corrected as shown below:

Column 1, line 10, replace "5,279,505" with --5,279,503--.

Column 1, line 51, delete " - " after account.

Column 2, line 42, replace "an-line" with --an in-line--.

Column 4, line 26, replace "an" with --a--.

Column 4, line 40, replace "a" with --an--.

Column 7, line 29, replace "21 0" with --210--.

Column 8, line 16, delete "o".

Column 8, line 66, replace "31 6" with --316--.

Column 8, line 67, replace "31 4" with --314--.

Column 9, line 13, replace "31 6" with --316--.

Column 10, lines 51-52, delete "a".

Column 10, line 57, after "538 located" insert the word --in--.

Column 11, line 8, replace "76" with --576--.

Column 11, line 13, replace "suitable" with --suitably--.

Column 11, line 53, delete "which".

Column 12, line 2, delete " ( ".

Column 12, line 24, delete "is".

Column 12, line 55, replace "an" with --a--.

UNITED STATES PATENT AND TRADEMARK OFFICE
CERTIFICATE OF CORRECTION

PATENT NO. : 5,482,432
DATED : January 9, 1996
INVENTOR(S) : Paliwoda et al.

It is certified that error appears in the above-indentified patent and that said Letters Patent is hereby corrected as shown below:

Column 14, line 46, insert after "will" the word --be--.

Column 15, line 42, replace "1 00" with --100--.

Column 16, line 13, after complementary delete "o".

Column 16, line 46, replace "71 2" with --712--.

Column 19, line 29, replace "a" with --an--.

In the Claims

Column 21, line 21, claim 9, delete "5".

Column 21, line 24, claim 10, replace "toot" with --tool--.

Column 21, line 27, claim 10, replace "for adapted" with --adapted for--.

Column 22, line 25, claim 19, after vehicle insert " , ".

Signed and Sealed this

Sixth Day of August, 1996

*Attest:*

BRUCE LEHMAN

*Attesting Officer*  *Commissioner of Patents and Trademarks*